United States Patent
Gao et al.

(10) Patent No.: US 11,140,456 B2
(45) Date of Patent: Oct. 5, 2021

(54) COMMUNICATION NETWORK, COMMUNICATION SYSTEM, AND COMMUNICATION METHOD FOR MULTICAST VIDEO STREAMING OVER COMMUNICATION PROVIDER BORDERS

(71) Applicant: HUAWEI TECHNOLOGIES CO., LTD., Shenzhen (CN)

(72) Inventors: Fang Gao, Munich (DE); Weidong Li, Munich (DE); Minwei Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 16/398,184

(22) Filed: Apr. 29, 2019

(65) Prior Publication Data

US 2019/0253764 A1 Aug. 15, 2019

Related U.S. Application Data

(63) Continuation of application No. PCT/EP2017/075112, filed on Oct. 4, 2017.

(51) Int. Cl.
| | | |
|---|---|---|
| *H04N 21/64* | (2011.01) | |
| *H04N 21/6405* | (2011.01) | |
| *H04L 12/761* | (2013.01) | |
| *H04L 12/725* | (2013.01) | |
| *H04L 12/46* | (2006.01) | |
| *H04L 29/12* | (2006.01) | |
| *H04N 21/266* | (2011.01) | |

(Continued)

(52) U.S. Cl.
CPC ..... *H04N 21/6405* (2013.01); *H04L 12/4641* (2013.01); *H04L 45/16* (2013.01); *H04L 45/30* (2013.01); *H04L 61/6022* (2013.01); *H04N 21/266* (2013.01); *H04N 21/6408* (2013.01); *H04L 12/1836* (2013.01)

(58) Field of Classification Search
None
See application file for complete search history.

(56) References Cited

U.S. PATENT DOCUMENTS

| | | | |
|---|---|---|---|
| 7,281,058 B1 | 10/2007 | Shepherd et al. | |
| 2004/0158872 A1* | 8/2004 | Kobayashi | .......... H04L 12/1886 725/120 |

(Continued)

FOREIGN PATENT DOCUMENTS

| | | |
|---|---|---|
| CN | 101005370 A | 7/2007 |
| CN | 101030918 A | 9/2007 |

(Continued)

*Primary Examiner* — Cai Y Chen

(57) ABSTRACT

A communication network, comprising a video server, adapted to generate a multicast video signal, and a first router is provided. The communication network is operated by a first communication provider. The first router is adapted to receive the multicast video signal, generate a plurality of unicast video signals from the multicast video signal, and provide each of the plurality of unicast video signals to one of a plurality of user devices, connected to a first further communication network, through at least a first further router, which is part of the first further communication network. The first further communication network is operated by a second communication provider.

13 Claims, 9 Drawing Sheets

(51) Int. Cl.
 *H04N 21/6408* (2011.01)
 *H04L 12/18* (2006.01)

(56) References Cited

U.S. PATENT DOCUMENTS

| | | | |
|---|---|---|---|
| 2007/0217415 A1 | 9/2007 | Wijnands et al. | |
| 2007/0283397 A1* | 12/2007 | Scholl | H04N 7/17318 725/86 |
| 2010/0043022 A1* | 2/2010 | Kaftan | H04N 21/235 725/34 |
| 2010/0223391 A1 | 9/2010 | Wu et al. | |

FOREIGN PATENT DOCUMENTS

| | | |
|---|---|---|
| CN | 101247541 A | 8/2008 |
| WO | 2008093208 A1 | 8/2008 |

\* cited by examiner

COMMUNICATION NETWORK, COMMUNICATION SYSTEM, AND COMMUNICATION METHOD FOR MULTICAST VIDEO STREAMING OVER COMMUNICATION PROVIDER BORDERS

CROSS-REFERENCE TO RELATED APPLICATIONS

This application is a continuation of International Application No. PCT/EP2017/075112, filed on Oct. 4, 2017, the disclosure of which is hereby incorporated by reference in its entirety.

TECHNICAL FIELD

The application relates to a communication network, system and method, especially for transmitting multicast signals over communication provider borders, even if the target network does not support multi cast video.

BACKGROUND

In Europe, the incumbent local exchange carrier (ILEC) have control over the accessing resources (FTTx, xDSL line and OLT/DSLAM) to the residential subscriber. Most competitive local exchange carrier (CLEC) need to lease from the according ILEC in order to develop its own users. Previously, the ILEC did not permit the CLEC to lease the accessing line. The ILEC only allowed a lease of the Metro link and of bandwidth. This was very expansive. Therefore, the CLEC could not provide internet protocol television (IPTV) service for its customers in this scenario.

Recently, the government forced the ILEC to lease the accessing line to CLEC, to ensure a fair completion between carriers. Therefore, the scenario is that the CLEC (e.g. Vodafone, OSP) now lease the accessing line (FTTx, xDSL) of the ILEC (e.g. Telefonica). But on the optical line terminal (OLT) of ILEC, the ILEC does not provide a multicast replication function to the CLEC, so the CLEC cannot replicate the IPTV multicast traffic to the users. For the scenario, shown-above, the prior method is to add a broadband network gateway (BNG)/miniBNG equipment at the edge central office (CO) site. The BNG is then used to copy the multicast traffic by user session. But in this solution, there are two significant disadvantages:
1) The CO site amount is large, and the miniBNG is a complex piece of equipment in comparison with a router. Firstly, it has high capital expenditure (capex). Secondly, the maintenance person for this large amount of edge CO needs to have significant technical abilities. It is difficult in Europe under the high cost of human labor. This solution exchanges the high link lease cost with high operation expense (opex) and capex on device and human labor. The carriers want to avoid this. Therefore, miniBNG does not achieve a high sales amount.
2) It is complex to integrate with carrier's Radius server, DHCP server, Portal server, operations support system (OSS). As BNG is the network equipment with the most complex function of subscriber, so the integration with a new vender's BNG in the network is very difficult.

SUMMARY

Accordingly, an object of the present application is to provide a communication network, system and method, which allow for a CLEC to offer multicast video streaming to its users, although the user is not directly connected to the CLEC network, but to an ILEC network. The object is solved by the features of claim 1 for the communication network, the features of claim 11 for the communication system and the features of claim 15 for the communication method.

According to a first aspect of the application, a communication network, comprising a video server, adapted to generate a multicast video signal, and a first router is provided. The communication network is operated by a first communication provider. The first router is adapted to receive the multicast videos signal, generating a plurality of unicast video signals from the multicast video signal and provide each of the plurality of unicast video signals to one of a plurality of user devices, connected to a first further communication network, through at least a first further router, which is part of the first further communication network. The first further communication network is operated by a second communication provider. This allows for a simple to implement multicast video transmission to users connected to an ILEC provider.

According to a first implementation formal of the first aspect, the first further router is an aggregation switch. This allows for a simple implementation.

According to a second implementation form of the first aspect, the communication network comprises a second router, connected to the video server. The second router is adapted to receive the multicast signal from the video server and provided to the first router. The first router is adapted to receive the multicast video signal from the second router. This allows for a large-scale communication network of the CLEC.

According to as third implementation form of the first aspect, the first further communication network comprises a second further router, connected to two at least a first part of the first plurality of user devices. The first router is then adapted to provide each of the plurality of unicast video signals to one of the first plurality of user devices, through the second further router and the first further router. This allows for a great flexibility of design of the first further communication network and thereby allows for a great flexibility of the deployment.

According to a fourth implementation form of the first aspect, the first further communication network comprises a third further router, connected at least to a second part of the first plurality of user devices. The first router is then adapted to provide each of the plurality of unicast video signals to one of the first plurality of user devices through the third further router and in the first further router. This allows for having separate exit points of the converted multicast traffic from the first communication network.

According to an implementation form of the two previous implementation forms, the second further router and/or the third further router are OLT. This allows for a seamless integration into state of the art networks.

According to a further implementation form of the first aspect, the first router is adapted to provide each of the plurality of unicast videos signals to one of a second plurality of user devices connected to a second further communication network through at least a fourth further router, which is part of the second further communication network. The second further communication network is operated by a third communication provider. This allows for providing multicast video streaming to users located within the domains of different communications providers.

According to a further implementation form of the first aspect, the first router is adapted to determine, if it is a last entity on a connection from the video server to a user device, capable of multicast traffic handling based upon a service VLAN (SVLAN) and a customer VLAN (CVLAN). This allows for a very simple determining if the router needs to perform the multicasting to unicast replication.

According to a further implementation form of the first aspect, the first router is adapted to generate the plurality of unicast signals based upon
- copy by Virtual Switching Instance (VSI), and/or
- copy by Media Access Control (MAC) address, and/or
- copy by virtual local access network (VLAN), and/or
- copy by interface/sub-interface.

Additionally or alternatively, the first router is adapted to generate the plurality of unicast signals based upon two of the previously shown alternatives. This allows for a great flexibility in generating the plurality of unicast signals.

According to a second aspect of the application, a communication system comprising a communication network as described, above and the first further communication network is provided. This allows for a very simple integration of the CLEC and the ILEC.

According to a first implementation form of the second aspect, the communication system additionally comprises the first plurality of user devices. This allows for a very simple network integration.

According to a further implementation form of the second aspect, the communication system additionally comprises the second further communication network. This further simplifies network integration.

According to an implementation form of the previous implementation form, the communication system additionally comprises the second plurality of user devices. This further simplifies network integration.

According to a third aspect of the application, a communication method for use in a communications system is provided. The communication system comprises a communication network and a first further communication network. The communication network is operated by a first communication provider, while the first further communication network is operated by a second communication provider. The method comprise generating a multicast video signal, by a video server of the communication network, receiving the multicast video signal, by a first router of the communication network, generating a plurality of unicast video signals from the multicast signal by the first router, providing each of the plurality of unicast video signals to a first further router of the first further communication network, and providing each of the plurality of unicast video signals to one of a first plurality of user devices, by the first further router. This allows for a simple to implement multicast video transmission to users connected to an ILEC provider.

According to a first implementation form of the third aspect, the method additionally comprises receiving the multicast signal from the video server, by a second router, providing it to the first router, by the second router, and receiving the multicast video signal from the second router, by the first router. This allows for a large-scale communication network of the CLEC.

According to a second implementation form of the third aspect, the first further communication network comprises a second further router, connected to at least a first part of the first plurality of user devices. The method then comprises the first router providing each of the plurality of unicast video signals to one of the first plurality of user devices, through the second further router. This allows for a great flexibility of design of the first further communication network and thereby allows for a great flexibility of the deployment.

According to a third implementation form of the first aspect, the method additionally comprises providing each of the plurality of unicast video signals to one of the first plurality of user devices, through a third further router of the first further communication network and the first further router. This allows for having separate exit points of the converted multicast traffic from the first communication network.

According to a further implementation form of the third aspect, the method additionally comprises providing each of the plurality of unicast video signals to one of a second plurality of user devices connected to a second further communication network by the first router, through at least a fourth further router, which is part of the second further communication network, the second further communication network being operated by a third communication provider. This allows for a very simple determining if the router needs to perform the multicasting to unicast replication.

According to a further implementation form of the third aspect, it is determined, by the first router, if the first router is the last entity on a connection from the video server to the user device, capable of multicast traffic handling, based upon a SVLAN and a CVLAN. This allows for a very simple determining if the router needs to perform the multicasting to unicast replication.

According to a further implementation form of the third aspect, the plurality of unicast signals is generated, by the first router, based upon
- copy by VSI, and/or
- copy by MAC address, and/or
- copy by VLAN, and/or
- copy by interface/sub-interface.

Additionally or alternatively, the plurality unicast signals is determined by the first router based upon two of the previously described options. This allows for a great flexibility in generating the plurality of unicast signals.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF DRAWINGS

The present application is in the following explained in detail in relation to embodiments of the application in reference to the enclosed drawings, in which.

DESCRIPTION OF EMBODIMENTS

Figure 1:
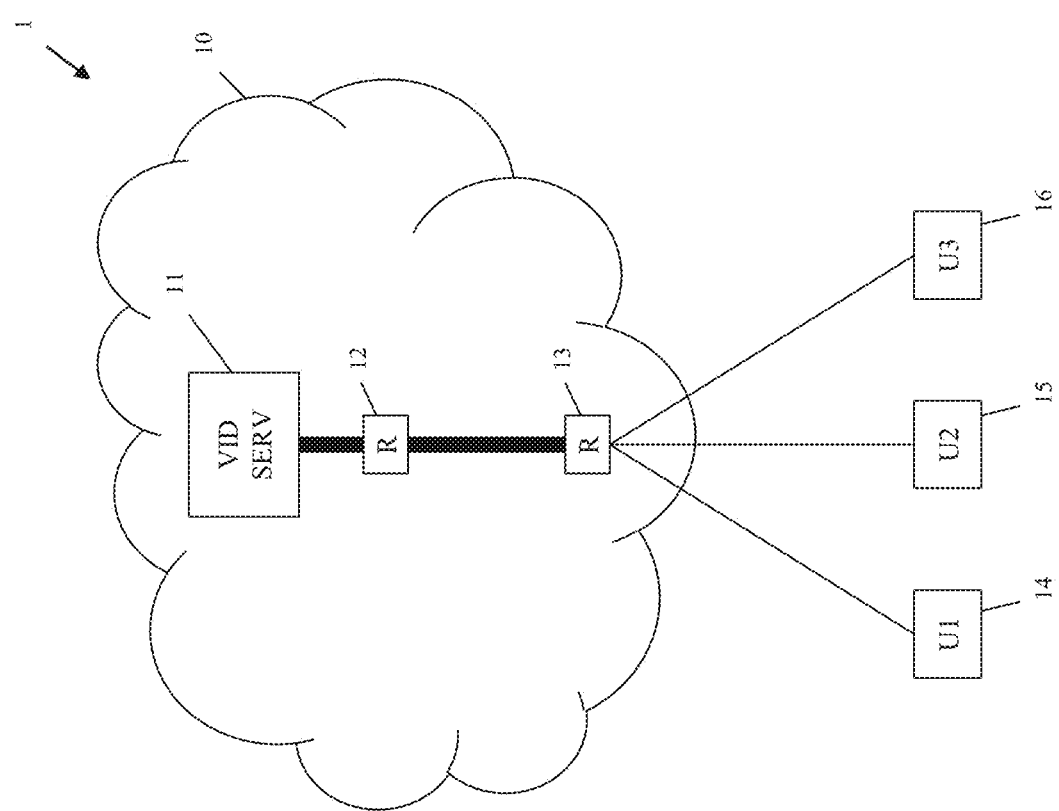
FIG. 1 shows a communication system with only a single ILEC communication network.

First we demonstrate the underlying problem along FIG. 1. With regard to FIG. 2, the construction and function of a first embodiment of the communication network and system according to the first and second aspect of the application are described. With regard to FIG. 3, an embodiment of the communication method of the third aspect of the application is shown. With regard to FIG. 4-FIG. 9, further details of different deployment scenarios of the communication network of the first aspect of the application are described. Similar entities and reference numbers in different figures have been partially omitted.

In FIG. 1, a communication system 1 is shown. The communication system 1 comprises a communication network 10, which belongs to an ILEC. The communication network 10 comprises a video server 11, connected to a router 12, which the router 12 is connected to a router 13. The router 13 is connected to three user devices 14, 15 and 16. In this scenario, the user devices are not part of the communication system 1 and the communication network 10. Alternatively, the user devices 14-16 can be considered as part of the communication network 10 and even of the communication system 1.

Here, the video server 11 generates a multicast signal and provides it to the router 12, which then provides multicast signal to the router 13, which then replicates the traffic and thereby generates a plurality of unicast signals, which are provided to the individual user devices 14-16. In this FIG., connections over which multicast traffic is guided, are displayed bold, while connections, over which unicast traffic is guided are displayed in a regular manner.

Figure 2:
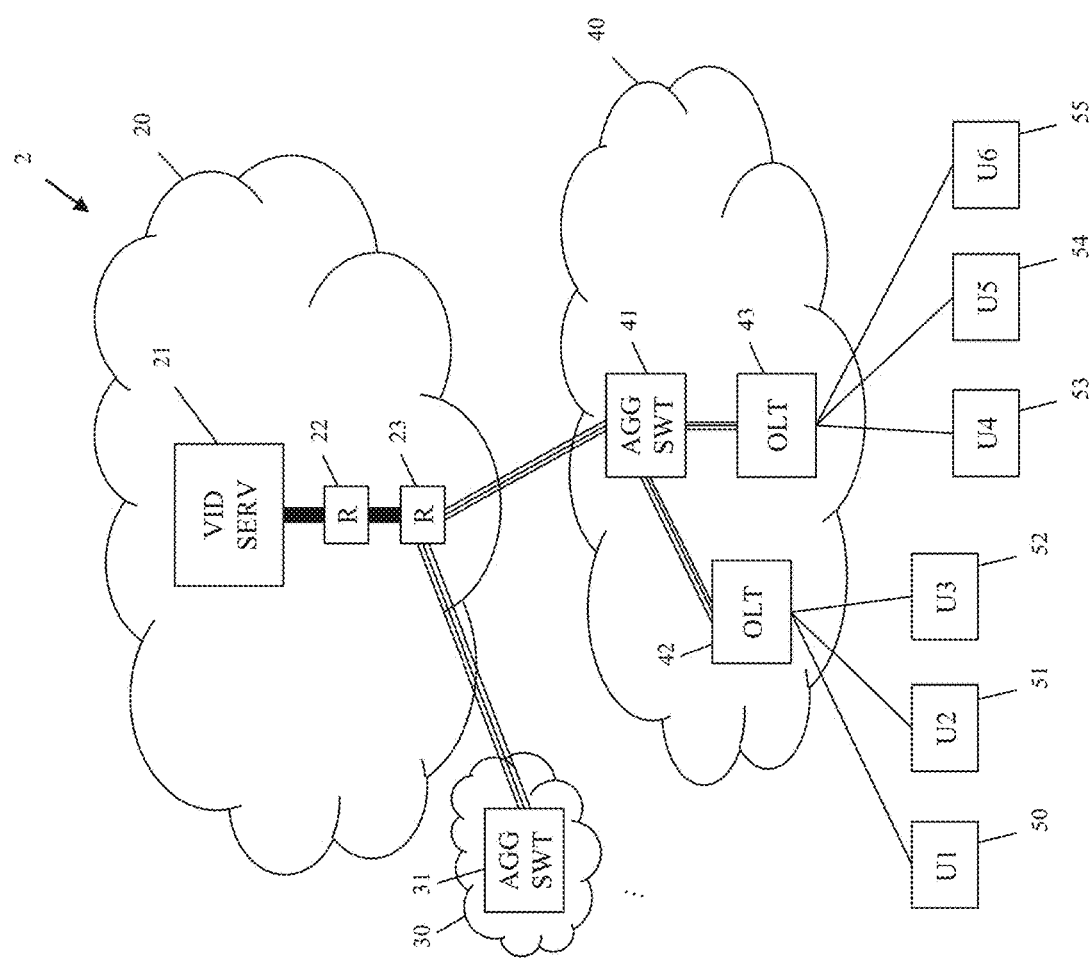
FIG. 2 shows a first embodiment of the communication system and communication network of the first and second aspect of the application.

Since the router 13 is the exit point of the communication network 10, it has the task of generating the unicast signals for the individual user devices 14-16. If the router 13 though were not directly connected to the user devices 14-16, a regular router could not perform the replication and therefore could not generate the unicast signals. This is the case, when the router 13 for example is connected to an ILEC communication network, which the ILEC communication network is connected to the user devices. Such a scenario is shown in FIG. 2. There, though already an embodiment of the present application is shown.

In FIG. 2, a communication system 2 comprising a communication network 20, a first further communication network 40 and a second further communication network 30, as well as a number of user devices 50-55 is shown.

The communication network 20 comprises a video server 21, connected to a router 22, which the router 22 is connected to a router 23. The communication network 20 belongs to a first communication provider.

The communication network 40 comprises a router 41, especially an aggregation switch, which is connected to the router 23. The router 41 is moreover connected to a router 42 and to a router 43, which are also part of the communication network 40. Especially, the routers 42, 43 are OLT.

Connected to each of the routers 42, 43 or a number of user devices 50-52, 53-55. Here, the user devices 50-55 are depicted as not belonging to the communication network 40.

The communication network 40 here belongs to an ILEC, to which the user devices 50-55 are connected. The communication network 20 belongs to a CLEC, which intends to provide multicast video streaming to the users. Moreover, the communication network 30 is set up in the same manner as the communication network 40. Here, only a router 31, especially an aggregation switch, is depicted. The communication network 30 belongs to a further communication provider. It is depicted only to show that the multicast video streaming to user devices connected through different communications providers is possible.

Again here, multicast traffic baring connections are depicted in bold, while unicast signal baring connections are depicted in a regular manner.

The video server 21 generates a multicast video signal and provides it to the router 22, which again provides it to the router 23. The router 23 is the last multicast-compatible device on the route between the video server 21 and the user devices 50-55.

The multicast traffic handling is determined by the router 23 based upon the SVLAN and the CVLAN.

The router 23 therefore replicates the multicast packet and thereby generates a plurality of unicast signals, which are then handed to the routers 31, 41, which hand them on to the routers 42, 43, which again distribute them to the individual user devices 50-55. From the prospective of the routers 31, 41, 42, 43, the individual unicast signals are not connected to each other and are handled like any other internet traffic.

When generating the plurality of unicast signals, the router 23 especially uses copying by VSI instance, and/or copying by MAC address, and/or copying by VLAN, and/or copying by interface/sub-interface.

Especially, the router can also use a combination of two of the above-shown options.

Figure 3:
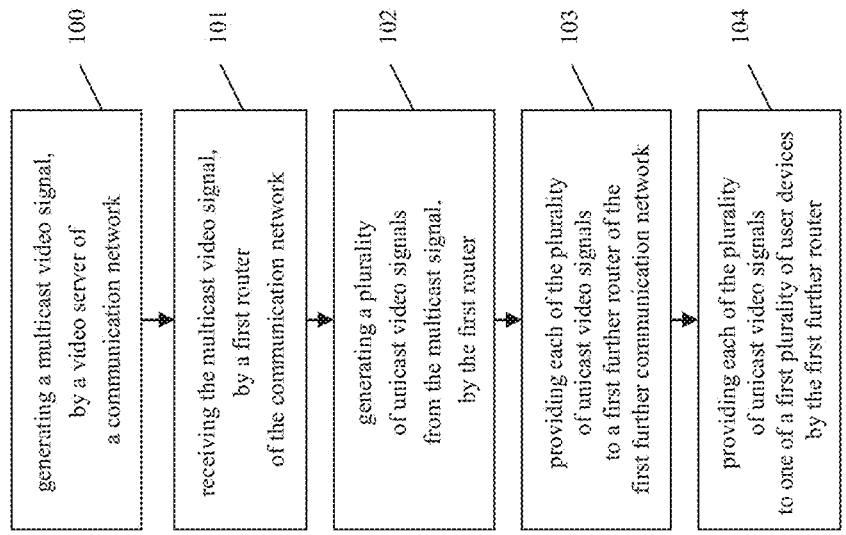
FIG. 3 shows an embodiment of the communication method of the third aspect of the application in a flow diagram.

In FIG. 3, an embodiment of the communication method according to the third aspect of the application is shown. In a first step 100, a multicast video signal is generated by a video server of a communication network. In a second step 101, the multicast video signal received by a first router of the communication network, and a third step 102, a plurality of unicast video signals is generated from the multicast signal, by the first router. In a fourth step 103, each of the plurality of unicast video signals is provided to a first further router of the first further communication network. In a final step 104, each of the plurality of video signals is provided to one of the first plurality of user devices, by the first router.

In general, the new solution solves the problem by replicating the multicast traffic to each user by a router which has no user session information. It comprises an enhancement of a previous IGMP-Snooping function. Originally, the Internet Group Management Protocol (IGMP) snooping function just snooped the port/sub-interface of the IGMP, and it just copied to port/sub-interface level. But now, the new function snoops the dual-stack of QinQ, as defined in IEEE 802.1ad, VLAN tag of the MAC address of the IGMP join packet which is sent by the user. Then it builds a L2 multicast forwarding table including the Multicast group, subinterface, VLAN/QinQ tag, and user mac information. After this, when the multicast IPTV traffic arrives, it is copied to each user under the subinterface. The packets are added the QinQ tag of the users, and the multicast MAC address is switched to user unicast MAC address.

As an optional feature, the packet is changed to user unicast, if the OLT could not let the multicast packet go through or have some rate limitation for multicast, then function changing the multicast MAC address to user unicast function cloud been enabled, else it could remain the multicast MAC address.

In the following, different possible deployment scenarios are shown:

L2 Multicast copy by user, mainly used in the scenario of Multicast traffic duplicate more than one users traffic based on the user's VLAN/MAC address that retained on the UPE/SPE/NPE. The user-network interface (UNI) that bind user VSI may be Qot1q termination interface, QinQ termination interface, QinQ mapping interface, QinQ stacking interface, and so on.

Figure 4:
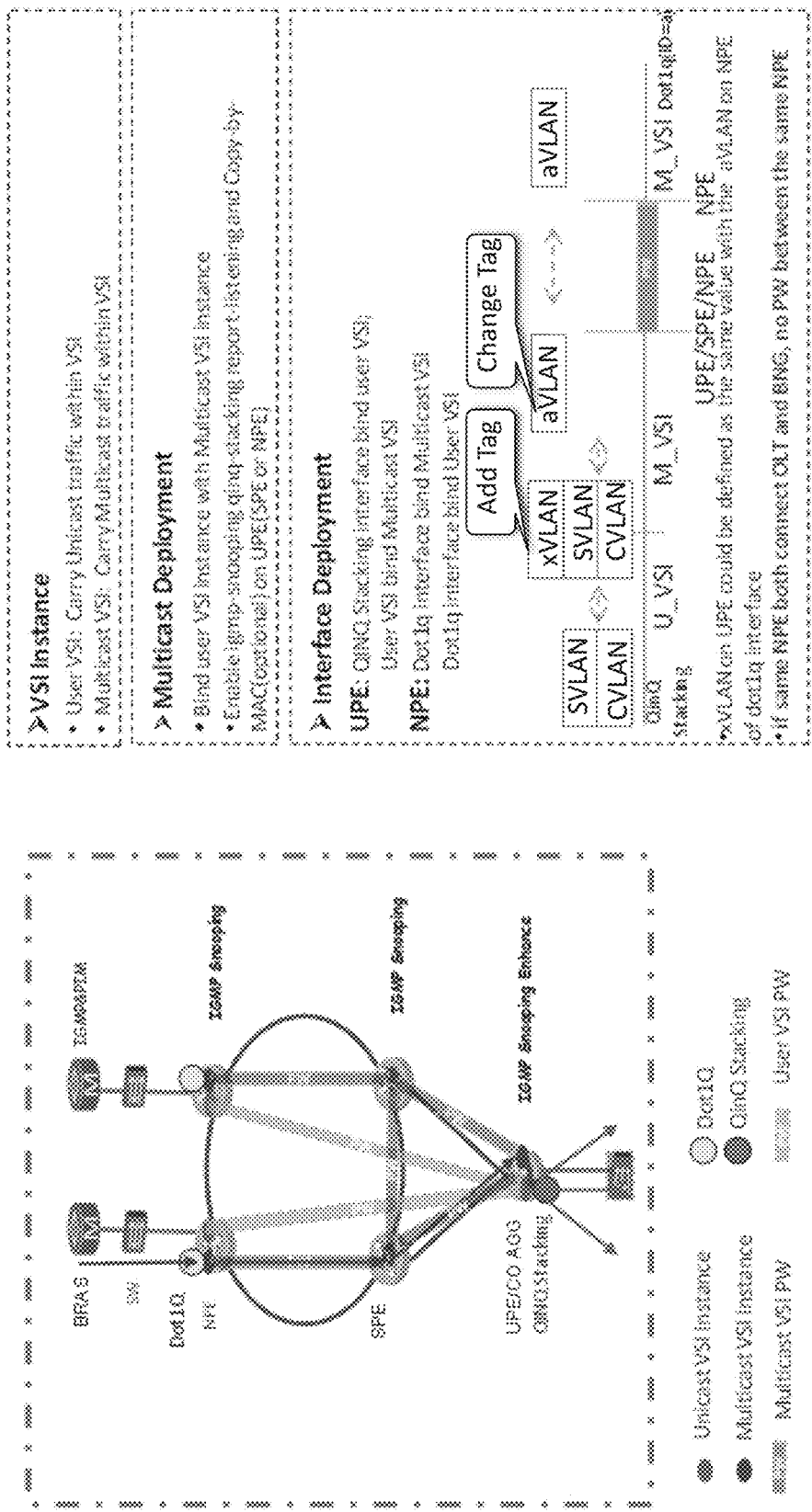
FIG. 4 shows a deployment scenario of a second embodiment of the communication network of the first aspect of the application.
Figure 5:
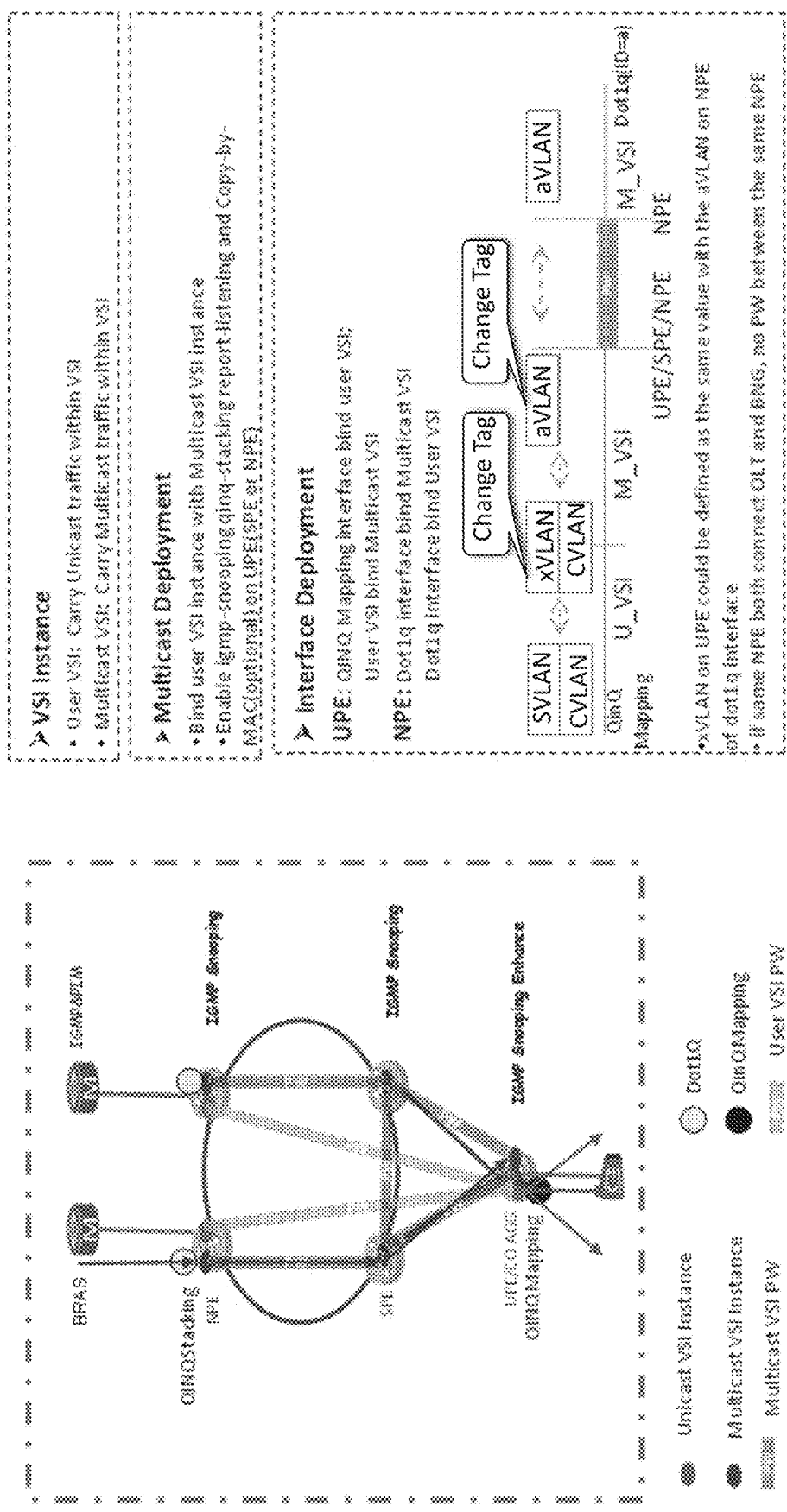
FIG. 5 shows a deployment scenario of a third embodiment of the communication network of the first aspect of the application.

Based on the FIG. 4 and FIG. 5, an UPE/CO AGG with QinQ stacking interface and QinQ mapping interface is illustrated. Other types of interface with the similar mechanism does not illustrate any more.

In FIG. 4, QinQ stacking is shown, while in FIG. 5, QinQ mapping is shown.

The deployment of this function can be based on interface or User VSI. This function consists of two parts, enable/disable this function based on interface or User VSI.

The UPE/CO AGG enables traffic with multicast MAC address or unicast MAC address to users based on interface or User VSI.

When OLT or the same layer device supports Multicast MAC traffic duplication:

Enable L2 Multicast copy by user and packet copy by Multicast MAC address in part interface(s), these interface (s) and other interface(s) bind the same User VSI.

Only the interface where this function is enabled can duplicate L2 multicast copy by user and packet copy by Multicast.

MAC address, the others interfaces without enable this function do not support this function.

Figure 6:
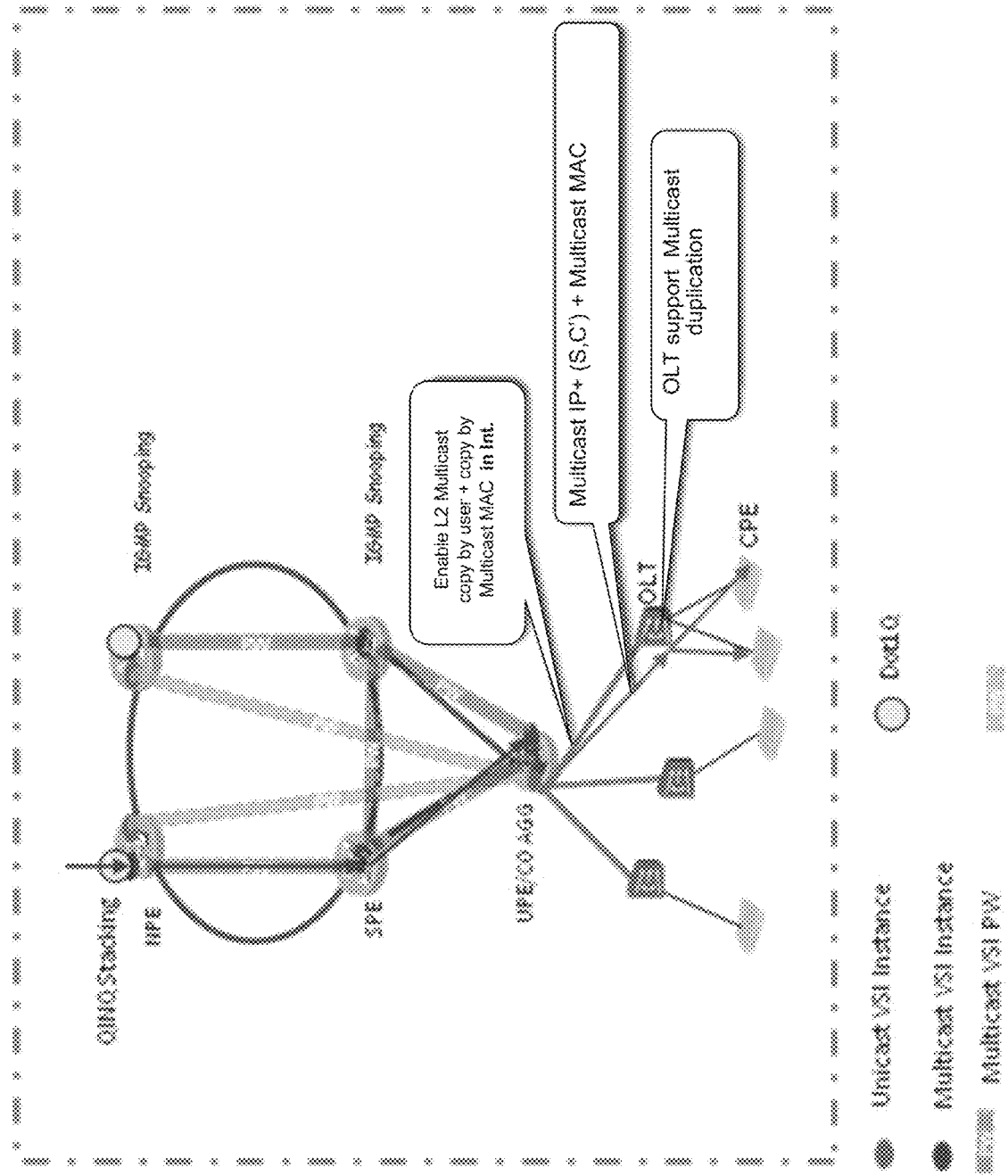
FIG. 6 shows a deployment scenario of a fourth embodiment of the communication network of the first aspect of the application.

This is shown in FIG. 6.

When OLT or the same layer device does not support Multicast traffic duplication:

Enable L2 Multicast copy by user and packet copy by Unicast MAC address in part interface(s), these interface(s) and other interface(s) bind the same User VSI.

Only the interface where this function is enabled can duplicate L2 multicast copy by user and packet copy by Unicast.

MAC address, the others interfaces without enable this function does not support this function.

Figure 7:
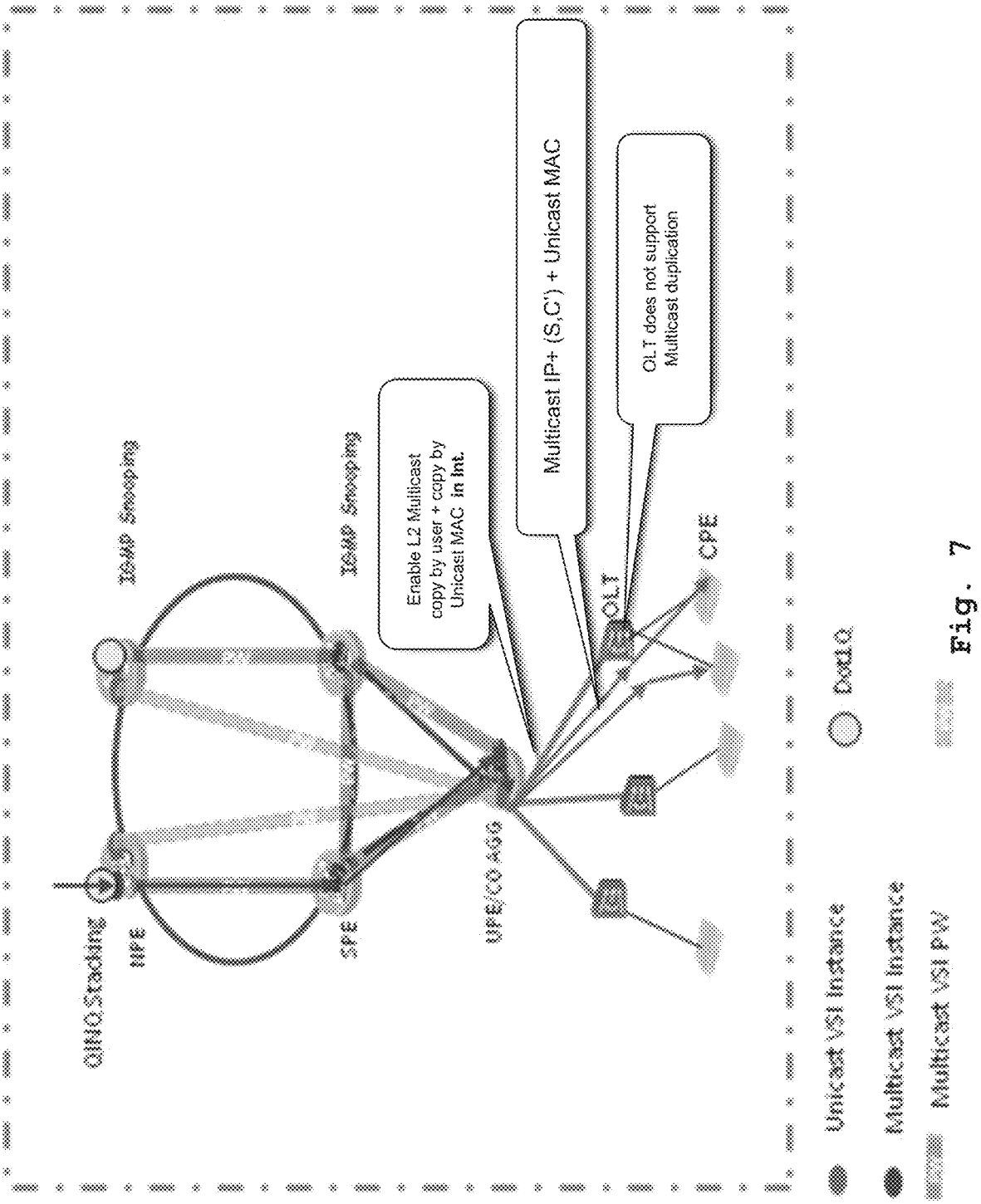
FIG. 7 shows a deployment scenario of a fifth embodiment of the communication network of the first aspect of the application.

This is shown in FIG. 7.

When OLT or the same layer device supports Multicast traffic duplication:

Enable L2 Multicast copy by user and packet copy by Multicast MAC in User VSI, all the interface(s) bind the same User VSI.

All the interfaces that support this function can duplicate L2 multicast copy by user and packet copy by Multicast MAC address.

Figure 8:
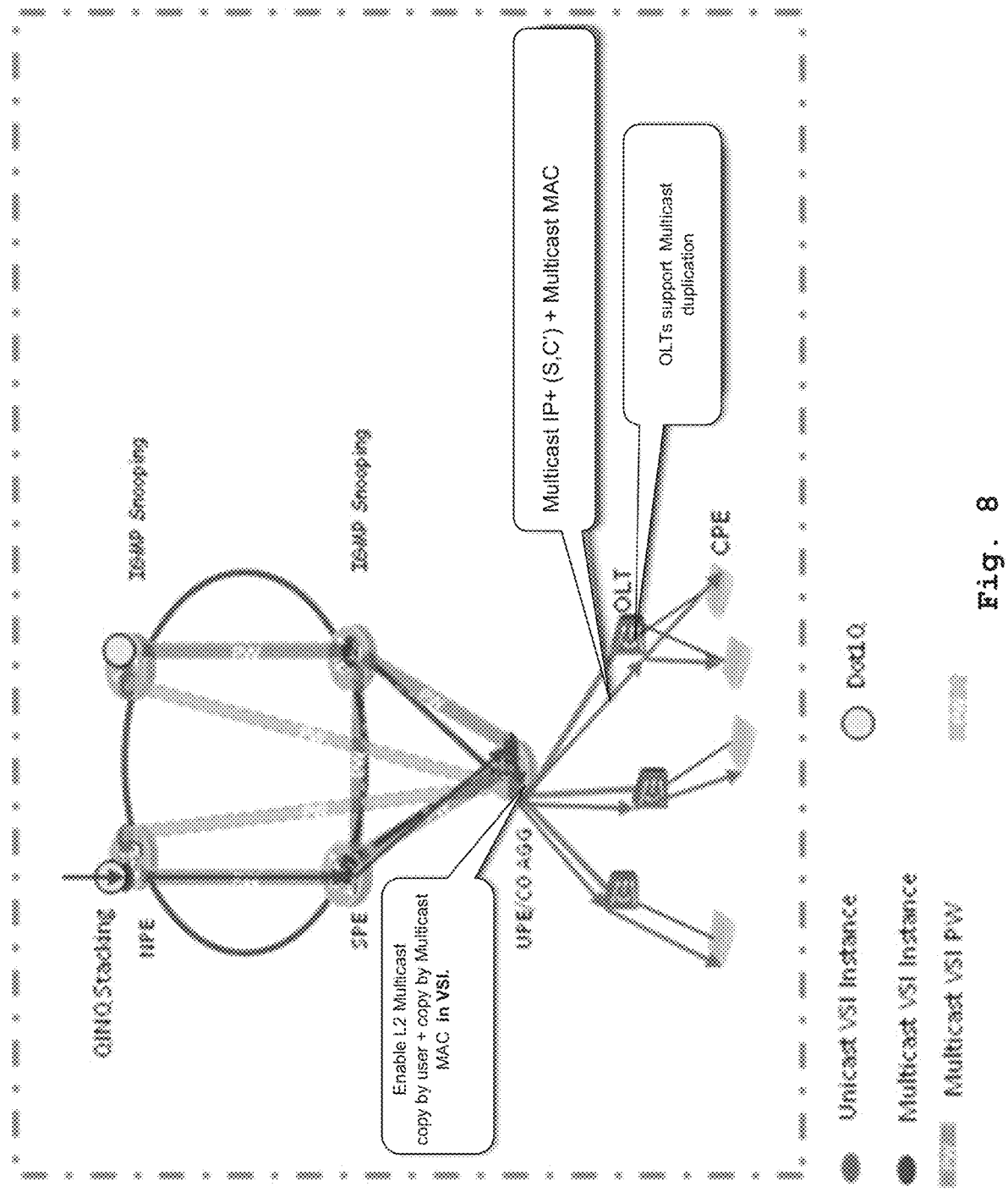
FIG. 8 shows a deployment scenario of a sixth embodiment of the communication network of the first aspect of the application.

This is shown in FIG. 8.

When OLT or the same layer device does not support Multicast traffic duplication:

Enable L2 Multicast copy by user and packet copy by Unicast MAC address in User VSI, all the interface(s) bind the same User VSI.

All the interfaces that support this function can duplicate L2 multicast copy by user and packet copy by Unicast MAC address.

Figure 9:
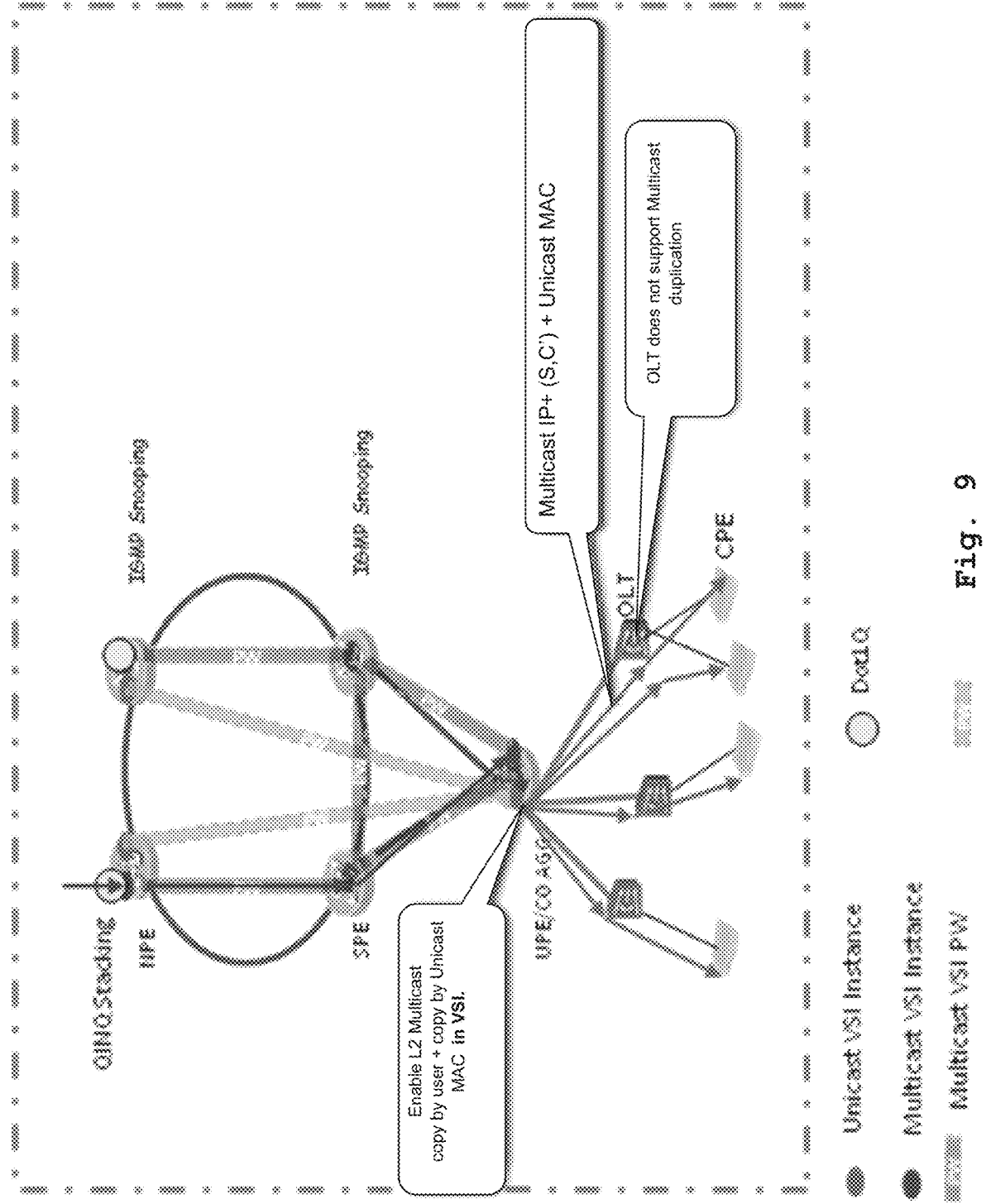
FIG. 9 shows a deployment scenario of a seventh embodiment of the communication network of the first aspect of the application.

This is shown in FIG. 9.

Note:

The same function (copy by user/copy by multicast MAC address/copy by unicast MAC address) that within interface prior to within User VSI.

The function of copy by user and copy by multicast MAC address/unicast MAC address can be deployed respectively.

In the following, some abbreviations and concepts used in this document are explained:

ILEC (incumbent local exchange carrier)—The historic local phone service provider in a market, often a former Bell company. Distinct from CLECs, competitive local exchange carriers, new market entrants.

Normally just one ILEC per country, Like Deutsche Telecom, Telefonica Spain, Orange France, BT of UK.

CLEC (competitive local exchange carrier)—Acronym for Competitive Local Exchange Carrier. A company that sells access to the public switched telephone network, or other last mile network connections, in competition with a traditional telephone company. Like: O2, VDF, Versatel in Germany; OSP, OSP in Spian; SFR, Free, Bytel in France. Normally, there are several CLEC in one country.

FTTx (fiber to the x, Fiber-based network)—Fiber to the x (FTTx) is a generic term for any broadband network architecture that uses optical fiber to replace all or part of the usual metal local loop used for last mile telecommunications. It include different type or scenario as below:

FTTH (fiber to the home, fiber-based networking scenario)—The FTTH scenario provides the following services: asymmetric broadband services (digital broadcast service, video on demand (VoD), file download, and online gaming), symmetric broadband services (content broadcast, email, file exchange, distance education, and distance medical care), POTS, and ISDN services.

FTTC (fiber to the cabinet)

FTTB (fiber to the building)

xDSL (x digital subscriber line, Cable-Based network)—A family of bandwidth-efficient modulation techniques, developed to achieve extremely high data transfer rates over twisted-pair cables. While the letter "X" represents a variable, DSL stands for "Digital Subscriber Line". XDSL techniques may offer several benefits such as, capability to offer data services to customers, low cost by using existing infrastructure and switching congestion relief caused by existing data users.

A family of bandwidth-efficient modulation techniques, developed to achieve extremely high data transfer rates over twisted-pair cables. Where, letter "X" represents a variable and DSL stands for "Digital Subscriber Line". It consists of ADSL, HDSL, VDSL accesses. Users on the access network are usually scattered community users. The access network also carries data access service and voice service.

For example, ADSL: asymmetrical digital subscriber line, A technology for transmitting digital information at a high bandwidth on existing phone lines to homes and businesses. Unlike regular dialup phone service, ADSL provides continuously-available, "always on" connection. ADSL is asymmetric in that it uses most of the channel to transmit downstream to the user and only a small part to receive information from the user. ADSL simultaneously accommodates analog (voice) information on the same line. ADSL is generally offered at downstream data rates from 512 kbit/s to about 6 Mbit/s.

Normally, fiber based accessing network have higher speed and bandwidth than cable based xDSL. The highest speed is FTTH which could be 1G, xDSL will serval M to hundred M.

OLT (optical line terminal)—Accessing Device for FTTH, which located in CO(central office) or Cabinet on the street.

DSLAM (Digital subscriber line access multiplexer)—Accessing Device for xDSL of cable-based, which located in CO(central office) or Cabinet on the street.

A network device, usually situated in the central office of a telephone company, that receives signals from multiple customer Digital Subscriber Line (DSL) connections and uses multiplexing techniques to put these signals on a high-speed backbone line.

Edge Central Office (CO) Site—the "central office" which connect to user devices. The Site mean location. For example, Spain VDF have a number of CO sites in Madrid.

CO site amount—means the number of the CO sites.

BNG (broadband network gateway)—as gateway for the broadband service access. Realize the access user management and responsible for communication with Radius server. The chassis of BNG is very large.

miniBNG—Is the small-size of BNG, so that can be deployed in CO site. Normally, miniBNG also as CO device, realize user access and aggregation.

Radius server—realizes authentication, accounting, authorization for access users. To control user authentication and login.

portal server—When a user accesses an external network for the first time, the Router redirects the access request to the specified server (normally the portal server of carriers), this operation is called mandatory portal. The Internet website that the user first accesses is one of the services of the website specified by carriers.

The portal server displays the page at the URL that the user enters before portal authentication if the user passes the portal authentication. Or, the user is directed to the portal page and has to enter the initial URL again after the portal authentication to access the page.

OSS (operations support system)—mainly assist operator to deal with network with the function of end-to-end design, Service provisioning, Monitoring, and error handling, etc.

DHCH Server—A program that allocates the IP addresses of the local address pool to the users at the user side and allocates the IP addresses of the relay address pool to the users that pass through the DHCP proxy at the network side.

HVPLS—In a VPLS solution, all PEs that provide VPLS services must be fully meshed using label switched paths (LSPs). N×(N−1)/2 PWs must be established using signaling protocols between PEs for each VPLS service. The preceding solution cannot be applied on a large scale, because the PEs that provide virtual circuits (VCs) must copy packets, and each provider edge (PE) must broadcast the first unicast, broadcast and multicast packets to all the peers. This is a waste of bandwidth. In this situation, you can use hierarchical connections to reduce the burden of signaling protocols and packet replication and apply VPLS on a large scale.

The core of hierarchical virtual private LAN service (HVPLS) is to hierarchize the network. The network of each level is fully meshed. Devices of different levels are connected using PWs and forward data to each other without complying with the split horizon principle.

HVPLS is introduced to cope with the problem of VPLS full mesh and enhance the expansibility of VPLS networks.

In a basic HVPLS model, PEs can be classified into the following types:

User-end PE (UPE): A customer convergence device that directly connects to CEs. A UPE needs to be connected to only one PE on a full-mesh VPLS network. A UPE supports routing and MPLS encapsulation. If a UPE connects to multiple CEs and possesses the basic bridge function, frame forwarding is performed only on the UPE. This implementation reduces the burden on SPEs.

SPE: A device that connects to UPEs and is located in the core of a full-mesh VPLS network. An SPE connects to all the devices on a full-mesh VPLS network. PW switching point.

Network provider edge (NPE): A router that is located on the network provider's premises. Similar with SPE, is the PE on the opposite location, have Full mesh peer with SPE.

From the perspective of an SPE, a UPE functions like a CE. In data forwarding, an SPE uses the PW established between itself and a UPE as an AC. The UPE adds double MPLS labels to packets sent by CEs. The outer label is an LSP label that is switched when a packet passes through devices on the access network. The inner label is a VC label that identifies a VC. The inner label remains unchanged when a packet is transmitted along an LSP. After receiving double-tagged packets, an SPE directly removes the outer label, a statically configured public network label and determines the VSI which the AC accesses based on the inner label.

UNI interface—user-network interface; the interface connect with user in VPLS instance.

UNI interface is the interface between CE and PE.

VPLS—virtual private LAN service (VPLS: A type of point-to-multipoint L2VPN service provided over the public network. VPLS enables geographically isolated user sites to communicate with each other through the MAN/WAN as if they are on the same LAN.

VSI—VPLS instance

The virtual private LAN service (VPLS) is an MPLS-based Ethernet point-to-multipoint (P2MP) L2VPN service provided over a public network. VPLS ensures that geographically isolated user sites can communicate over MANs and WANs as if they were on the same LAN. VPLS is also called transparent LAN service (TLS).

In a typical VPLS networking mode, users located in different geographical regions communicate with each other over different PEs. From the perspective of users, a VPLS network is a Layer 2 switched network that allows them to communicate with each other in a way similar to communication over a LAN.

Qot1q termination—Removes the single tags carried in packets before sending the packets.

Qot1q termination interface—Qot1q Termination is performed on a router sub-interface; therefore, the sub-interface for terminating single VLAN tags is referred as a Dot1q termination sub-interface, that is: Sub-interface for Dot1q VLAN tag termination: A single VLAN tag is stripped.

QinQ termination—Removes the double tags carried in packets before sending the packets.

QinQ termination interface—QinQ Termination is performed on a router sub-interface; therefore, the sub-interface for terminating double VLAN tags is referred as a QinQ termination sub-interface, that is:

Sub-interface for QinQ VLAN tag termination: Double VLAN tags are stripped.

Sub-interfaces for QinQ VLAN tag termination can be further divided into the following two types:

Explicit sub-interface for QinQ VLAN tag termination: The double VLAN tags each have a fixed value.

Implicit sub-interface for QinQ VLAN tag termination: The double VLAN tags each define a VLAN range.

QinQ mapping—Map VLAN tags in user packets to specified tags before the user packets are transmitted across the public network.

QinQ stacking—Enable adds an outer VLAN tag to the packets before the user packets are transmitted across the public network.

Dot1Q interface—That is Ethernet sub-interface which with 802.1Q. An Ethernet sub-interface can be configured on a physical interface or logical interface and can have an IP address configured to implement inter-VLAN communication. An Ethernet sub-interface has Layer 3 features. It shares the physical layer parameters of the main interface but has independent link layer and network layer parameters. Enabling or disabling an Ethernet sub-interface does not affect the main interface where the sub-interface resides, whereas the main interface status affects the Ethernet sub-interface. Specifically, the Ethernet sub-interface can work properly only if the main interface is Up.

The application is not limited to the examples. The characteristics of the exemplary embodiments can be used in any advantageous combination.

The application has been described in conjunction with various embodiments herein. However, other variations to the disclosed embodiments can be understood and effected by those skilled in the art in practicing the claimed application, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. A router configured to:
  receive a multicast video signal generated by a video server of a first communication network operated by a first local exchange carrier,
  generate a plurality of unicast video signals from the multicast video signal, and
  transmit each of the plurality of unicast video signals to one of a first plurality of user devices through at least a first router, first plurality of user devices being connected to a second communication network, the first router being part of the second communication network, wherein the second communication network is operated by a second local exchange carrier, the first local exchange carrier and the second local exchange carrier are different local exchange carriers, and generating the plurality of unicast video signals from the multicast video signal includes, for each of the plurality of unicast video signals to be transmitted to the respective user device:
    copying the multicast video signal according to a virtual local area network (VLAN) tag of the respective user device to obtain the unicast video signal to be transmitted to the respective user device, wherein the VLAN tag is configured for the router to transmit the multicast video signal in the first communication network to the respective user device in the second communication network; or
    copying the multicast video signal according to the VLAN tag of the respective user device and a user unicast MAC address of the respective user device, to obtain the unicast video signal to be transmitted to the respective user device, wherein the VLAN tag and the user unicast MAC addresses are configured for the router to transmit the multicast video signal in the first communication network to the respective user device in the second communication network,
  wherein the VLAN tag of the respective user device is a QinQ tag including both a service virtual local area network (SVLAN) identifier of the respective user device and a customer virtual local area network (CVLAN) identifier of the respective user device, the SVLAN identifier uniquely identifies a SVLAN, and the CVLAN identifier uniquely identifies a CVLAN.

2. The router of claim 1, wherein the first router is an aggregation switch.

3. The router of claim 1, wherein the first communication network comprises a second router, connected to the video server, wherein the second router is configured to receive the multicast video signal from the video server and provide the multicast video signal to the router, and wherein the router is further configured to receive the multicast video signal from the second router.

4. The router of claim 1, wherein the second communication network comprises a second router connected to at least a first part of the first plurality of user devices, and wherein the router is further configured to provide each of the plurality of unicast video signals to one of the first plurality of user devices, through the second router and the first router.

5. The router of claim 4, wherein the second communication network comprises a third router, connected at least to a second part of the first plurality of user devices, and wherein the router is further configured to provide each of the plurality of unicast video signals to one of the first plurality of user devices, through the third router and the first router.

6. The router of claim 4, wherein the second router is an optical line terminal (OLT), and/or the third router is an OLT.

7. The router of claim 1, further configured to provide each of the plurality of unicast video signals to one of a second plurality of user devices connected to a third communication network, through at least a fourth router, the at least a fourth router being part of the third communication network, wherein the third communication network is operated by a third local exchange carrier.

8. The router of claim 1, further configured to receive an Internet Group Management Protocol (IGMP) join packet sent by each user device in the first plurality of user devices, wherein the IGMP join packet comprises the following information of the user device sending the IGMP join packet:
  an SVLAN identifier and a CVLAN identifier, and/or
  an user unicast media access control (MAC) address.

9. A communication system comprising the router according to claim 1 and the second communication network.

10. The communication system of claim 9, further comprising the first plurality of user devices.

11. A communication method for use in a communication system, the communication system comprising a first communication network and a second communication network, wherein the first communication network is operated by a first local exchange carrier, wherein the second communication network is operated by a second local exchange carrier, the first local exchange carrier and the second local exchange carrier are different local exchange carriers, wherein the method comprises:
  generating a multicast video signal by a video server of the first communication network,
  receiving the multicast video signal, by a first router of the first communication network,
  generating a plurality of unicast video signals from the multicast signal by the first router,
  providing each of the plurality of unicast video signals to a second router of the second communication network, and
  providing each of the plurality of unicast video signals to one of a first plurality of user devices, by the second router; and, wherein
  generating the plurality of unicast video signals from the multicast signal by the first router comprises, for each of the plurality of unicast video signals to be transmitted to the respective user device:
  copying, by the first router, the multicast video signal according to a virtual local area network (VLAN) tag of the respective user device, to obtain the unicast video signal to be transmitted to the respective user device, wherein the VLAN tag is used by the first router to transmit the multicast video signal in the first communication network to the respective user device in the second communication network, or
  copying, by the first router, the multicast video signal according to the VLAN tag of the respective user device and a user unicast MAC address of the respective user device, to obtain the unicast video signal to be transmitted to the respective user device, wherein the VLAN tag and the user unicast MAC addresses are used by the first router to transmit the multicast video signal in the communication network to the respective user device in the first communication network,
  wherein the VLAN tag of the respective user device is a QinQ tag including both a service virtual local area network (SVLAN) identifier of the respective user device and a customer virtual local area network (CVLAN) identifier of the respective user device, the SVLAN identifier uniquely identifies a SVLAN, and the CVLAN identifier uniquely identifies a CVLAN.

12. A communication system comprising the router according to claim 7, the second communication network, and the third communication network.

13. The communication system according to claim 12, further comprising the second plurality of user devices.

* * * * *